United States Patent
Reinmuth et al.

(10) Patent No.: US 12,448,281 B2
(45) Date of Patent: Oct. 21, 2025

(54) MICROMECHANICAL SENSOR STRUCTURE WITH DAMPING STRUCTURE

(71) Applicant: Robert Bosch GmbH, Stuttgart (DE)

(72) Inventors: Jochen Reinmuth, Reutlingen (DE); Monika Koster, Reutlingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 170 days.

(21) Appl. No.: 18/044,252

(22) PCT Filed: Nov. 29, 2021

(86) PCT No.: PCT/EP2021/083326
§ 371 (c)(1),
(2) Date: Mar. 7, 2023

(87) PCT Pub. No.: WO2022/117494
PCT Pub. Date: Jun. 9, 2022

(65) Prior Publication Data
US 2023/0331544 A1    Oct. 19, 2023

(30) Foreign Application Priority Data

Dec. 2, 2020 (DE) .................... 10 2020 215 238.1

(51) Int. Cl.
*G01P 15/08* (2006.01)
*B81B 7/00* (2006.01)
*G01P 3/44* (2006.01)

(52) U.S. Cl.
CPC ............. *B81B 7/0016* (2013.01); *G01P 3/44* (2013.01); *G01P 15/08* (2013.01); *B81B 2201/0235* (2013.01); *G01P 2015/0882* (2013.01)

(58) Field of Classification Search
CPC . B81B 7/0016; B81B 2201/0235; G01P 3/44; G01P 15/08; G01P 2015/0882
See application file for complete search history.

(56) References Cited

U.S. PATENT DOCUMENTS 11,493,531 B2 * 11/2022 Reinke .................. G01P 15/097
2017/0023608 A1    1/2017 Tang et al.
2021/0088545 A1 *  3/2021 Tang ....................... G01P 1/003

FOREIGN PATENT DOCUMENTS

DE    102011083487 A1    3/2013
DE    102013208684 A1    11/2014
(Continued)

OTHER PUBLICATIONS

International Search Report for PCT/EP2021/083326, Issued Mar. 9, 2022.

*Primary Examiner* — Xin Y Zhong
(74) *Attorney, Agent, or Firm* — NORTON ROSE FULBRIGHT US LLP

(57) ABSTRACT

A micromechanical sensor structure. The micromechanical sensor structure including: a substrate; a mass which can be elastically deflected relative to the substrate; a measuring unit for detecting a deflection of the mass; and a damping structure for damping a deflection of the mass. The damping structure includes first and second damping combs which mesh together. The first damping comb is arranged on the mass and the second damping comb is arranged movably on a deflecting structure. When the mass is deflected in a first direction, the second damping comb is moved via the deflecting structure relative to the substrate in a second direction opposite the first direction.

15 Claims, 7 Drawing Sheets

(56) References Cited

FOREIGN PATENT DOCUMENTS

| | | |
|---|---|---|
| DE | 102013212059 A1 | 1/2015 |
| DE | 102016215829 A1 | 3/2018 |

* cited by examiner

MICROMECHANICAL SENSOR STRUCTURE WITH DAMPING STRUCTURE

FIELD

The present invention relates to a micromechanical sensor structure having a damping structure.

BACKGROUND INFORMATION

MEMS structures, which are etched out of thick polysilicon functional layers, are frequently used to produce acceleration sensors. These are arranged over thin, buried polysilicon layers. These layers for their part are anchored to a substrate by an oxide layer. The buried layer in such case may serve as a printed conductor or as an electrode. The functional layer may further be released via a trench process and a sacrificial oxide layer method. The buried layer may be electrically separated from the substrate via an oxide. The printed conductors and electrodes may further be designed to be so wide that they are not completely undercut in an oxide sacrificial oxide etching step and thus are stably anchored to the substrate.

The micromechanical structures thus produced are usually sealed with a cap wafer in the continuation of the process. Depending on the application, a suitable pressure may be enclosed within the closed volume. The closure in such case may be produced via a seal glass bonding method or via a eutectic bonding method, for example with AlGe.

When producing an acceleration sensor, ordinarily a freestanding deflectable mass is produced in the functional layer, the mass being fixed to the substrate via spring elements. In order to measure a deflection of the freestanding mass relative to the substrate due to an externally applied acceleration, ordinarily the changes in capacitance between electrode surfaces attached to the freestanding mass and electrode surfaces firmly anchored to the substrate are detected. A distance between the electrode surfaces arranged on the movable mass and the fixed electrode surfaces in such case should be selected to be as short as possible in order to obtain a large capacitive signal and, associated with this, high excitation sensitivity of the sensor.

A reaction of the sensors to vibrations is ordinarily undesirable, which is why sensors are intentionally damped. For this purpose, damping combs which mesh together may be provided both on the deflectable mass and on the substrate. If the deflectable mass moves perpendicularly to a direction of extension of damping fingers of the damping combs, the distance between opposing damping fingers is reduced and fluid located between the fingers is compressed and forced out of the combs. This operation is referred to as so-called squeeze film damping. In contrast to slide film damping, in which the mass is moved parallel to the direction of extension of the damping fingers and the distance between the damping fingers remains unchanged, squeeze film damping means that very high damping values can be obtained even with small comb structures.

The damping which can be obtained when a fluid flows out between two plates which are moving toward one another in a first approximation is directly proportional to the viscosity of the fluid and to the number, length of the damping fingers, and is indirectly proportional to the cube of the distance between directly opposing fingers.

This behavior is beneficial in particular for acceleration sensors. On one hand, the acceleration sensors have to be suspended very softly in order to obtain high sensitivity. On the other hand, in the event of an overload applied from the outside, the movable mass should not strike the fixed structures at too high a speed and in so doing damage them.

In order to prevent such striking, damping fingers can be used and designed in such a way that, shortly before the movable mass is struck, very short distances between opposing damping fingers occur in the damping combs, and hence high damping effects can be obtained. This is beneficial in particular for sensors for which a very high degree of damping is sought.

Such implementation is however difficult for acceleration sensors, which advantageously are supposed to possess measuring sensitivity for higher frequencies as well, for which consequently a high degree of damping is disadvantageous. If a distance between the damping fingers is increased, so that merely a lesser damping action occurs in normal operation, a distance between the opposing measuring electrodes would also have to be enlarged in order, in the case of a high degree of deflection of the mass, to continue to obtain sufficient damping and to be able to avoid the mass striking the immovable structures. This would however involve a great reduction in the sensitivity of the sensor. Although a reduction in the sensitivity could be compensated by enlarging the electrode surfaces, this would increase the mass of the movable mass and, associated with this, increase the energy when the mass strikes, which in turn would require a greater degree of damping.

SUMMARY

It is an object of the present invention to make available a micromechanical sensor structure with improved damping behavior.

This object may achieved by features of the present invention. Advantageous configurations of the present invention are disclosed herein.

According to one aspect of the present invention, a micromechanical sensor structure having a damping structure is provided. According to an example embodiment of the present invention, the sensor structure comprises:
- a substrate;
- a mass which can be elastically deflected relative to the substrate;
- a measuring unit for detecting a deflection of the mass; and
- a damping structure for damping a deflection of the mass, comprising first and second damping combs which mesh together, wherein the first damping comb is arranged on the mass and the second damping comb is arranged movably on a deflecting structure, and wherein, when the mass is deflected in a first direction, the second damping comb is moved via the deflecting structure relative to the substrate in a second direction opposite the first direction.

This makes it possible to obtain the technical advantage that a micromechanical sensor structure with improved damping behavior can be provided. By way of the damping structure with first and second damping combs, of which the first damping comb is arranged on the deflectable mass and the second damping comb is arranged movably on a deflecting structure, a deflection of the deflectable mass owing to an external acceleration of the micromechanical sensor structure can be damped. To this end, the first and second damping combs with corresponding damping fingers mesh together and are movable toward each other. By way of the deflecting structure, when the deflectable mass is deflected in a first direction, the second damping comb can be moved in a second direction opposite the first direction. Because of the deflection of the deflectable mass, the first damping comb fastened to the deflectable mass thus moves in the direction of the second damping comb. Due to the deflecting structure, furthermore, the second damping comb is moved in the direction of the first damping comb. Because of the reciprocal movement of the first and second damping combs toward one another, distances between the damping fingers of the first and second damping combs that are arranged parallel to each other and mesh together are reduced at a greater speed than a distance between the first and second measuring electrodes of the measuring unit.

As a result, in a normal state of the micromechanical sensor structure the first and second damping combs of the damping structure can be operated each with large distances between the damping fingers of the first and second damping structures that are arranged parallel to each other. As a result, the micromechanical sensor structure can be operated in a normal state with low damping, so that the micromechanical sensor structure has high response behavior, and hence high frequency accelerations are detectable. If the deflectable mass is deflected strongly owing to an overload of the micromechanical sensor structure, the first and second damping combs are moved toward each other by the deflecting structure at a higher speed than the deflectable mass is moved onto fixed structures of the micromechanical sensor structure owing to the external acceleration.

As a result, the distances between damping fingers of the first and second damping combs are reduced at a higher speed than a distance between first and second measuring electrodes of the measuring unit. As a result, it is possible that, in the event of great acceleration of the deflectable mass owing to an external overload of the micromechanical sensor structure, short distances between the damping fingers of the first and second damping combs of the damping structure may be produced, as a result of which a high degree of damping of the movement of the deflectable mass is obtained. As a result, it is possible to avoid the deflectable mass hitting fixed structures of the micromechanical sensor structure. Thus, a slight damping behavior in the normal state and a strong damping behavior in the event of an overload of the micromechanical sensor structure can be obtained by the micromechanical sensor structure, and in particular the deflecting structure. Owing to the possible strong damping behavior in the event of overload, the first and second measuring electrodes of the measuring unit may continue to be configured at a short distance from each other, as a result of which high measuring sensitivity of the micromechanical sensor structure can be obtained.

According to one specific embodiment of the present invention, the deflecting structure takes the form of a rocker structure with a pivotable lever arm, wherein the lever arm is pivotably mounted via a first spring element anchored to the substrate, wherein the second damping comb is arranged on a first end of the lever arm, and wherein the lever arm is connected to the mass via a second spring element arranged on a second end of the lever arm.

This makes it possible to obtain the technical advantage that a deflecting structure which is configured as technically simply as possible can be provided, which is equipped, when the deflectable mass is deflected, to move the second damping comb in a direction opposite to the direction of deflection of the deflectable mass.

According to one specific embodiment of the present invention, the micromechanical sensor structure comprises a plurality of damping structures.

This makes it possible to obtain the technical advantage that the damping behavior of the micromechanical sensor structure can be further improved. Owing to the plurality of damping structures, in particular in the event of overload of the micromechanical sensor structure, improved damping behavior owing to the plurality of damping combs which mesh together and an associated increased damping performance can be obtained.

According to one specific embodiment of the present invention, the mass is fastened elastically deflectably to the substrate via the first spring elements of the deflecting structures.

This makes it possible to obtain the technical advantage that simplified suspension of the deflectable mass is made possible. Owing to the mounting of the deflectable mass via the first spring elements of the deflecting structure, the deflectable mass is connected elastically deflectably to the substrate. Further spring elements for deflectably mounting the deflectable mass on the substrate are thus not necessary.

According to one specific embodiment of the present invention, the first spring elements of the damping structures are connected to the substrate in a common anchoring structure.

This makes it possible to obtain the technical advantage that as compact as possible a construction of the micromechanical sensor structure can be provided. By anchoring the plurality of first spring elements of the plurality of damping structures in a common anchoring structure, the response behavior of the individual first spring elements can furthermore be synchronized, so that a uniform damping behavior of the plurality of damping structures can be provided.

According to one specific embodiment of the present invention, the damping structures are arranged on an edge region of the mass and at least partly this mass; and/or damping structures are arranged in an inner region of the mass and are at least partly encompassed by the mass.

This makes it possible to obtain the technical advantage of a compact construction of the micromechanical sensor structure.

According to one specific embodiment of the present invention, second damping combs of adjacent damping structures are connected together via a common third spring element.

This makes it possible to obtain the technical advantage that improved damping behavior can be provided. Connecting adjacent second damping combs of adjacent damping structures by a third spring element means that a rotational portion of the movement of the second damping combs can be reduced owing to the deflection of the deflecting structure and in particular owing to the deflection of the lever arm of the rocker structure. As a result, a pure translational movement of the second damping combs relative to the respective first damping combs can be obtained, so that the damping fingers of the first and second damping combs of a damping structure which mesh together in each case can continue to remain arranged parallel. As a result, the damping behavior can be made more precise.

According to one specific embodiment of the present invention, a first length of a first portion of a lever arm between the first spring element and the second spring element amounts to more than twice a second length of a second portion of the lever arm between the first spring element and the third spring element.

This makes it possible to obtain the technical advantage that the damping properties of the damping structure can be further improved. In combination with a third spring element which connects adjacent second damping combs together, the distances result in a movement of the second damping combs that is as linear as possible owing to the deflection of the deflecting structure.

According to one specific embodiment of the present invention, the lever arm extends along a direction perpendicular to a direction of deflection of the mass.

This makes it possible to obtain the technical advantage that as precise as possible a response behavior of the deflecting structure which takes the form of a rocker structure and an associated precise damping behavior of the damping structure upon deflection of the deflectable mass can be obtained.

According to one specific embodiment of the present invention, a length of a lever arm amounts to more than 15% of a diameter of the mass.

This makes it possible to obtain the technical advantage that as soft as possible a suspension of the damping structure can be obtained. The suspension of the damping structure which is as soft as possible means that the response behavior of the deflectable mass, in particular in the case of a low load, is merely minimally influenced by the damping structure, so that a precise measuring behavior of the micromechanical sensor structure can be obtained.

According to one specific embodiment of the present invention, a damping behavior of the damping structure can be varied by way of a positioning of a suspension point at which the lever arm is connected to the first spring element.

This makes it possible to obtain the technical advantage that the damping behavior of the damping structure can be set variably. The lever action of the lever arm can be varied via the positioning of the suspension point of the lever arm on the first spring element. As a result, the deflection of the second damping comb formed on the lever arm owing to a deflection of the deflectable mass, and an associated damping behavior of the damping structure, can be adapted to the properties of the respective micromechanical sensor structure.

According to one specific embodiment of the present invention, the measuring unit comprises at least a first measuring electrode arranged on the substrate and a second measuring electrode, arranged opposite the first measuring electrode on the mass, wherein the first and second damping combs have first and second damping fingers extending perpendicularly to a direction of deflection of the mass and arranged parallel to the first and second measuring electrodes, which damping fingers have an identical electrical potential.

This makes it possible to obtain the technical advantage that precise damping behavior of the damping structure can be obtained. Owing to the parallel orientation of the first and second damping fingers opposing each other, a uniform damping behavior of the damping structure can be obtained by uniform variation of the distances between directly opposing damping fingers. The same applies to the parallel arrangement of the damping fingers in relation to the first and second measuring electrodes arranged in opposition, which are each arranged in a direction of extension oriented perpendicularly to the direction of deflection of the deflectable mass. The identical electrical potential of the first and second damping fingers of the first and second damping combs means that electrostatic attraction between damping fingers can be prevented and thus the damping behavior improved.

According to one specific embodiment of the present invention, in a rest position of the mass a distance between directly opposing first and second damping fingers is greater than a distance between directly opposing first and second measuring electrodes.

This makes it possible to obtain the technical advantage that in the normal state of the micromechanical sensor structure, that is to say, in the case of slight deflection of the deflectable mass, a slight damping action of the damping structure is made possible owing to the great distances between directly opposing first and second damping fingers. As a result, a high response behavior or a high measuring accuracy and sensitivity of the micromechanical sensor structure to high frequency accelerations can be obtained. Via the action described above of the deflecting structure, the distance between opposing first and second damping fingers when the deflectable mass is deflected strongly can be reduced at a higher speed than a distance between directly opposing first and second measuring electrodes, so that if the deflectable mass is deflected strongly owing to an externally acting overload, a strong damping action can be obtained owing to a short distance between directly opposing first and second damping fingers.

According to one specific embodiment of the present invention, the mass is fastened elastically deflectably to the substrate via at least one suspension spring element.

This makes it possible to obtain the technical advantage that improved elastically deflectable fastening of the deflectable mass to the substrate can be provided.

According to one specific embodiment of the present invention, the micromechanical sensor structure takes the form of an acceleration sensor or yaw rate sensor or micromirror.

This makes it possible to obtain the technical advantage that as broad as possible a field of application of the micromechanical sensor structure with the above-mentioned advantages can be provided.

Embodiments of the present invention will be discussed with reference to the figures.

DETAILED DESCRIPTION OF EXAMPLE EMBODIMENTS

Figure 1:
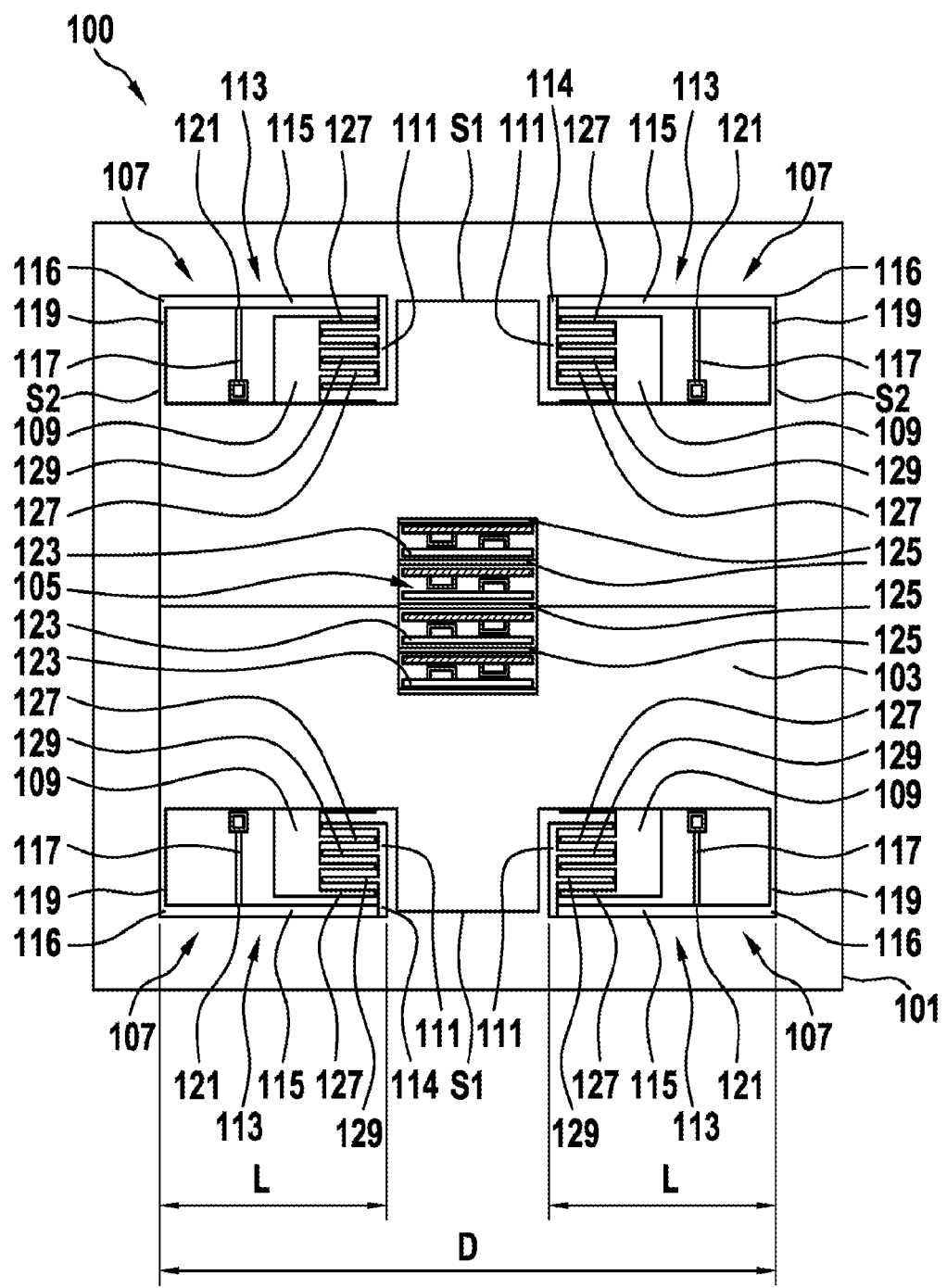
FIG. 1 shows a schematic illustration of a micromechanical sensor structure with damping structure according to one specific embodiment of the present invention.

FIG. 1 shows a schematic illustration of a micromechanical sensor structure 100 with a damping structure according to one specific embodiment of the present invention.

In the specific embodiment in FIG. 1, the micromechanical sensor structure 100 comprises a substrate 101, an elastically deflectable mass 103 arranged relative to the substrate 101, a measuring unit 105 which is equipped to detect a deflection of the deflectable mass 103, and a damping structure 107 for damping a deflection of the deflectable mass 103.

In the specific embodiment in FIG. 1, the damping structure 107 comprises a first damping comb 109 and a second damping comb 111. The first damping comb 109 is arranged firmly on the deflectable mass 103. The second damping comb 111 is arranged movably, deflectably via a deflecting structure 113. The deflecting structure 113 in the specific embodiment shown takes the form of a rocker structure and comprises a lever arm 115 which is arranged pivotably on the substrate via a first spring element 117. On a first end of the lever arm 114 there is arranged the second damping comb 111, whereas the lever arm 115 is connected to the deflectable mass 103 via a second spring element 119 arranged on the second end 116 of the lever arm 115.

The first and second damping combs 109, 111 each comprise first and second damping fingers 127, 129 arranged parallel to each other and alternately meshing together.

In the specific embodiment shown, the deflectable mass 103 is rectangular in form and has a first side S1 and a second side S2.

The first damping comb 109 is arranged in the middle on a first side S1 of the deflectable mass 103. A connection of the lever arm 115 of the damping structure 107 via the second spring element 119 is likewise provided on a first side S1 of the deflectable mass 103, the second spring element 119 being arranged on an outer edge of the second side S2 of the deflectable mass 103.

The measuring unit 105 comprises a plurality of first and second measuring electrodes 123, 125 arranged parallel to each other. The first measuring electrodes 123 are each fastened to the substrate 101, while the second measuring electrodes 125 are arranged on the deflectable mass 103.

In the specific embodiment shown, the first and second damping fingers 127, 129 of the first and second damping combs 109, 111 are each arranged parallel to each other and parallel to the first and second measuring electrodes 123, 125 of the measuring unit 105.

In the specific embodiment shown, the deflectable mass 103 is deflectable both in the positive and in the negative y-direction. The first and second measuring electrodes 123, 125 and also the first and second damping fingers 127, 129, on the other hand, extend in a direction perpendicular to the direction of deflection, in FIG. 1 therefore in the x-direction.

The lever arm 115 is connected to the first spring element 117 via a suspension point 121. When the deflectable mass 103 is deflected, the lever arm 115 is pivotable about the suspension point 121. By positioning the suspension point 121 on the lever arm 115, the lever ratios of the lever arm can be varied based on a change in the length ratios between the portion between the first end 114 and the suspension point 121 and the portion between the second end 116 of the lever arm 115 and the suspension point 121. By varying the lever ratios, when the deflectable mass 103 is deflected a movement of the second damping comb 111 brought about by pivoting the lever arm 115 and an associated damping behavior can be varied.

The deflectable mass 103 comprises a diameter D, which corresponds to a length of one of the lateral edges of the deflectable mass 103 which are arranged at right-angles.

The lever arm 115 has a length L. This may for example comprise 15% of the diameter D of the deflectable mass 103. In FIG. 1 the size and length ratios of the micromechanical sensor structure 100 shown are not illustrated true to length, so the lever arm 115 illustrated has a length which deviates from this numerical value.

In the specific embodiment shown, the micromechanical sensor structure 111 comprises a plurality of damping structures 107 which are configured identically according to what is described above. The individual damping structures 107 are arranged on each of the four corners of the deflectable mass 103, which is rectangular in form. The number or the arrangement of the individual damping structures 107 may vary and deviate at will from the specific embodiment shown here.

In the specific embodiment shown, the measuring unit 105 is arranged in the middle. Both the arrangement of the measuring unit 105 and the number of the first and second measuring electrodes 123, 125 arranged in parallel may deviate at will from the example shown in FIG. 1.

The number and size ratios of the first and second damping combs 109, 111 and also of the first and second damping fingers 127, 129 may likewise deviate from the specific embodiment illustrated merely schematically and by way of example in FIG. 1.

In the specific embodiment shown, the sensor structure 100 has four identically formed damping structures 107. Alternatively, a sensor structure 100 with merely one damping structure 107 or with any plurality of damping structures 107 whatsoever is also conceivable.

In FIG. 1, the micromechanical sensor structure 100 is illustrated as an acceleration sensor. The deflectable mass 103 in the specific embodiment shown is deflectable in the plane spanned by the spatial directions X and Y shown. Corresponding damping of the deflection of the deflectable mass 103 by the damping structure 107 formed likewise takes place within the spatial plane spanned by the spatial directions X, Y. Alternatively, the micromechanical sensor structure 100 may likewise be configured as a yaw rate sensor or as a micromirror. Furthermore, the deflection of the deflectable mass 103 can likewise be damped by the damping structure 107 for a portion of the deflection of the deflectable mass 103 which is perpendicular to the spatial plane X, Y shown.

Figure 2:
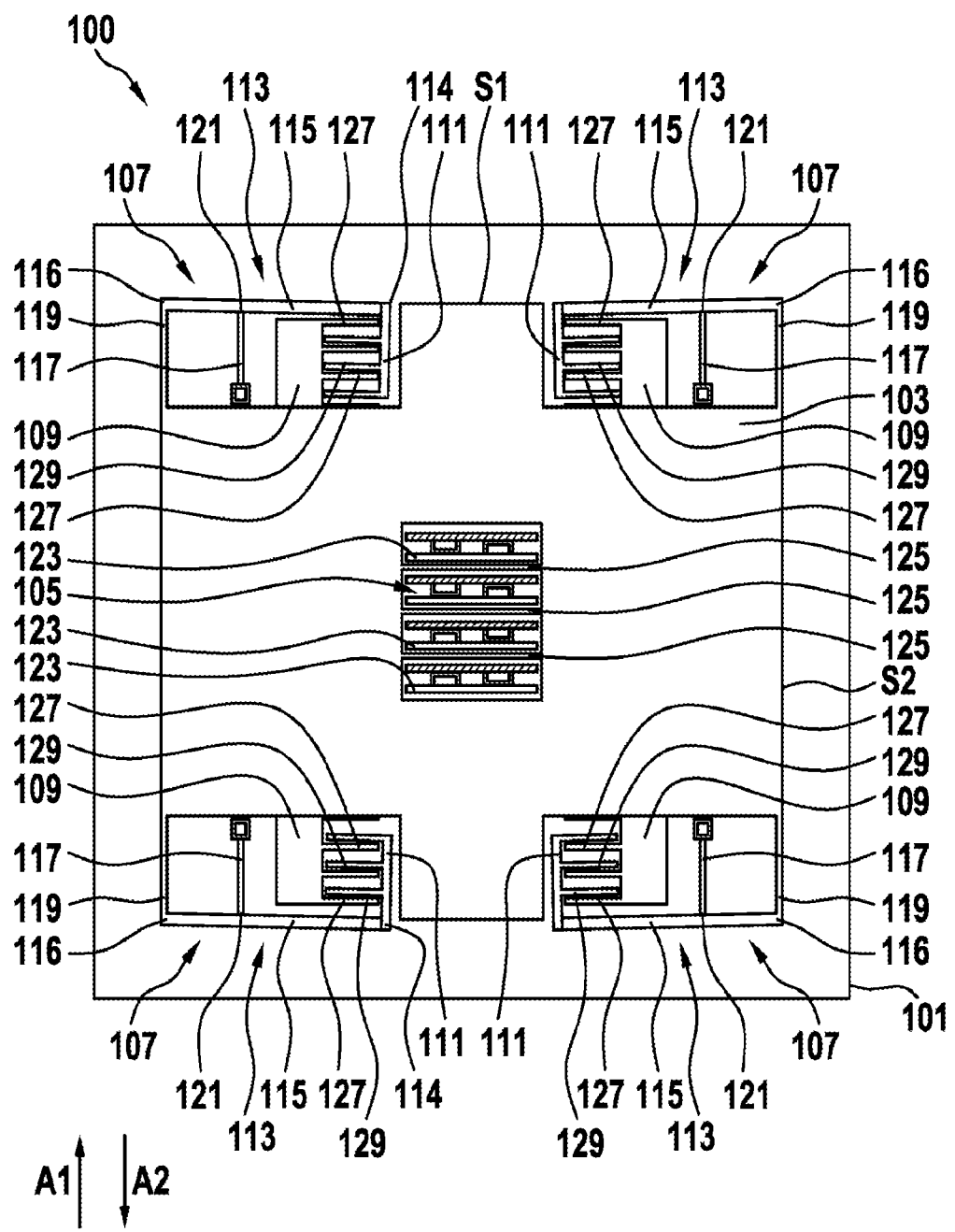
FIG. 2 shows a schematic illustration of the micromechanical sensor structure with damping structure in FIG. 1 in the deflected state.

FIG. 2 shows a schematic illustration of the micromechanical sensor structure 100 with damping structure in FIG. 1 in the deflected state.

FIG. 2 shows the micromechanical sensor structure 100 in FIG. 1 in a deflection state in which the deflectable mass 103 is moved in a first direction A1 and thus in the positive y-direction owing to a corresponding acceleration of the micromechanical sensor structure 100.

Due to the deflection of the deflectable mass 103 in the first direction A1, the second damping comb 111 of the damping structure 107 is moved by the deflecting structure 113 in a second direction A2 opposite the first direction A1, and hence in the negative y-direction.

Due to the deflection of the deflectable mass 103 in a first direction A1, the second end 116 of the lever arm 115, which is connected to the deflectable mass 103 via the second spring element 119, is likewise moved in the first direction A1. Due to the anchoring of the lever arm 115 to the substrate 101 via the first spring element 117, a pivoting movement of the lever arm 115 about the suspension point 121 takes place owing to the movement of the second end 116 of the lever arm 115 in the first direction A1. This in turn leads to a movement of the first end 117 of the lever arm 115 in the second direction A2 directed opposite to the first direction A1. This leads to a movement, likewise directed in the second direction A2, of the second damping comb 111 formed on the first end 114 of the lever arm 115. Due to the deflection of the deflectable mass 103 in the first direction A1, the first damping comb 109 arranged on the deflectable mass 103 is likewise moved in the first direction A1.

Due to the movement of the deflectable mass 103 in the first direction A1, a movement of the second measuring electrodes 125, formed on the deflectable mass 103, of the measuring unit 105 likewise takes place. The first measuring electrodes 123, on the other hand, are fastened to the substrate 101, so that no movement is carried out by it. Due to the relative movement of the second measuring electrodes 125 in relation to the first measuring electrodes 123, a reduction in the distances between the first and second measuring electrodes 123, 125, which are arranged parallel to each other and directly opposing each other, thus takes place.

At the same time, a reduction in the distances between the first and second damping fingers 127, 129, arranged in parallel and directly opposing each other, of the first and second damping combs 109, 111 takes place. Since, however, in contrast to the first and second measuring electrodes 123, 125, the first and second damping combs 109, 111 perform an oppositely directed movement in each case, distances between directly opposing first and second damping fingers 127, 129 are reduced at a higher speed by the deflection of the deflectable mass 103 than distances between directly opposing first and second measuring electrodes 123, 125, of which the first measuring electrodes 123 anchored to the substrate 101 do not perform any movement.

Due to the comparatively faster reduction in the distances between directly opposing first and second damping fingers 127, 129, an increased damping performance can be obtained with strong deflection of the deflectable mass 103, in that for increased deflection of the deflectable mass 103 owing to the greatly reduced distance between directly opposing first and second damping fingers 127, 129 an increased damping performance of the squeeze film damping can be obtained. At the same time, by the accelerated reduction in the distances between directly opposing first and second damping fingers 127, 129 relative to the reduction in distance between opposing first and second measuring electrodes 123, 125, a distance between opposing first and second damping fingers 127, 129 in an idle state can be increased relative to the distances between first and second measuring electrodes 123, 125. As a result, a slight damping action and an associated precise response behavior of the micromechanical sensor structure 100 for slightly deflected and high frequency accelerations of the micromechanical sensor structure 100 can be obtained.

When the deflectable mass 103 is deflected in the negative y-direction, the damping behavior of course occurs analogously to the method described above.

Figure 3:
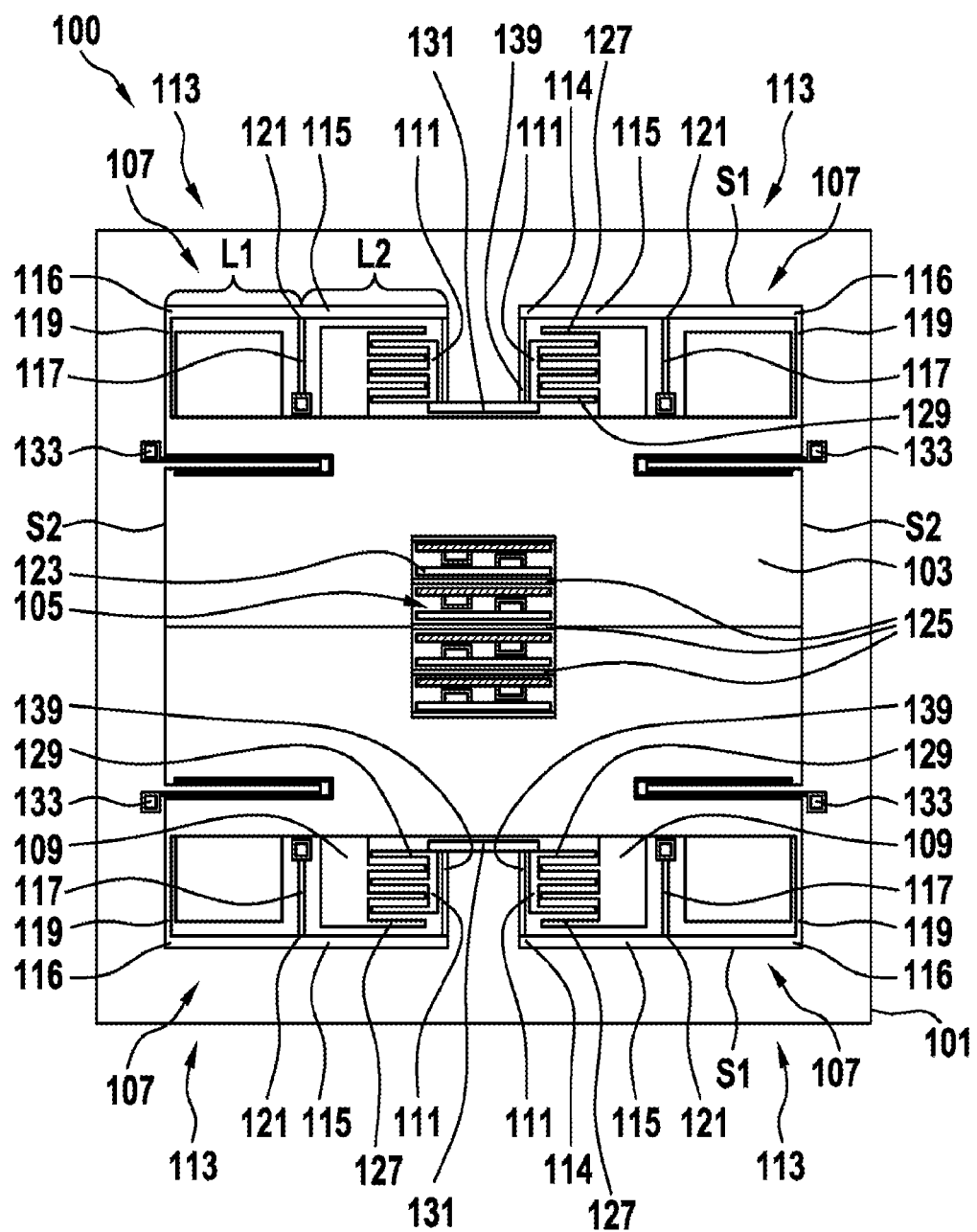
FIG. 3 shows a further schematic illustration of a micromechanical sensor structure with damping structure according to a further specific embodiment of the present invention.

FIG. 3 shows a further schematic illustration of a micromechanical sensor structure 100 with damping structure according to a further specific embodiment.

In a departure from the specific embodiments of FIGS. 1 and 2, the micromechanical sensor structure 100 in the specific embodiment in FIG. 3 further has a plurality of suspension spring elements 133, via which the deflectable mass 103 is mounted elastically deflectably on the substrate 101. The deflectable mass 103 is thus mounted on the substrate 101 via the plurality of suspension spring elements 133 and also via the plurality of first spring elements 117 of the damping structures 107.

Furthermore, in the specific embodiment shown, second damping combs 111 of adjacent damping structures 107 are connected together in each case via third spring elements 131.

The rest of the properties of the deflectable mass 103 of the measuring unit 105 and of the damping structure 107 correspond to those of the specific embodiments of FIGS. 1 and 2 and will not be described in detail anew below.

Figure 4:
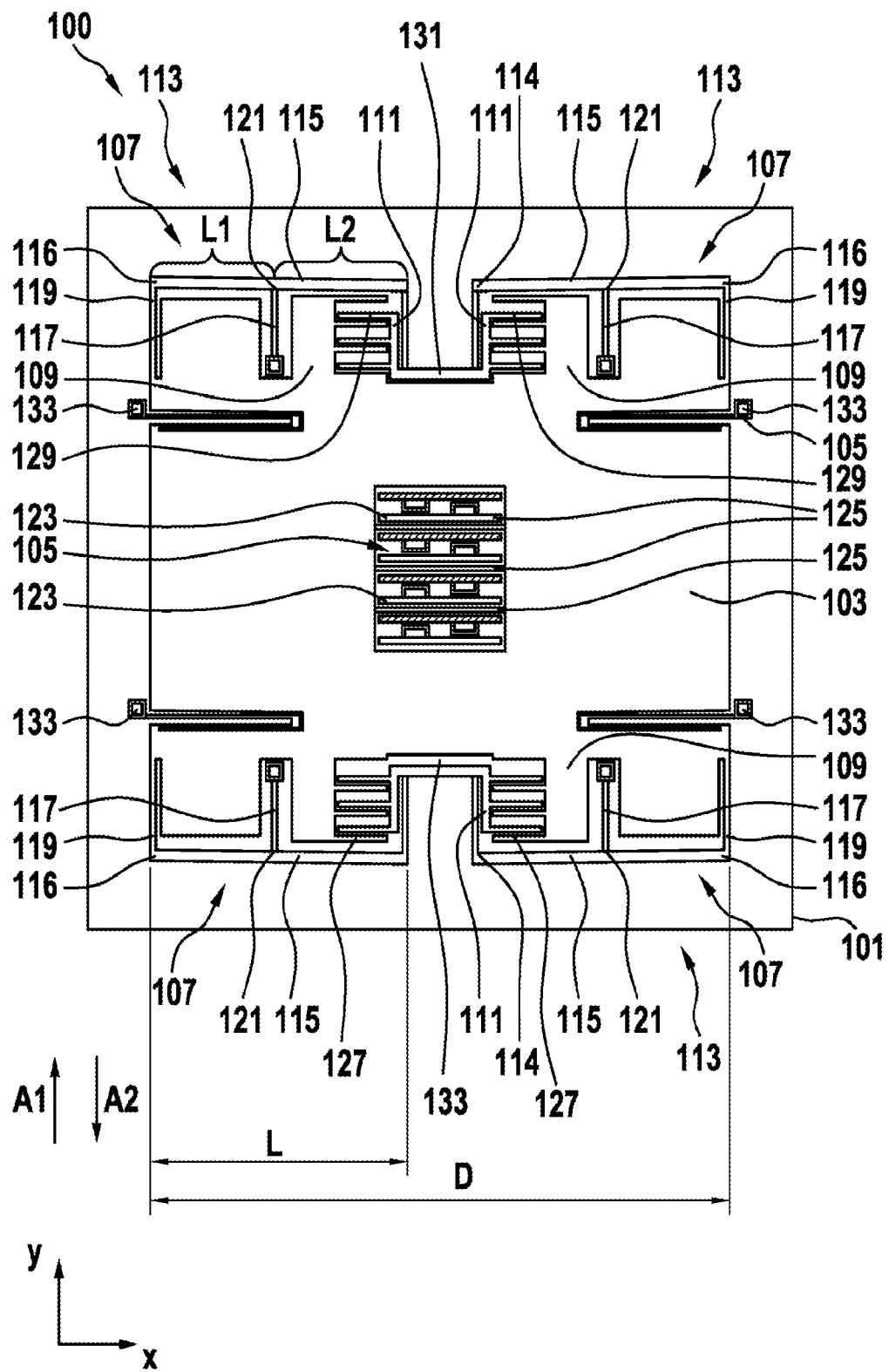
FIG. 4 shows a schematic illustration of the micromechanical sensor structure with damping structure in FIG. 3 in the deflected state.

FIG. 4 shows a schematic illustration of the micromechanical sensor structure 100 with damping structure in FIG. 3 in the deflected state.

The mode of operation of the damping structure 107 corresponds to the mode of operation of the damping structure 107 in the specific embodiment in FIGS. 1 and 2 and will therefore likewise not be described in detail anew below.

A rotational portion of a movement of the second damping combs 111 in the second direction A2, which is caused by the pivoting movement of the deflected lever arm 115, can be reduced or suppressed by the third spring element 131 which connects together adjacent second damping combs 111 of adjacent damping structures 107, By this rotary movement, higher modes, which as a rule are even more difficult to damp, can be reduced.

Further, the second damping combs 111 connected together via the third spring element 131 are connected to the first end 114 of the lever arm 115 of the respective damping structure 107 via a connecting element 139.

Figure 5:
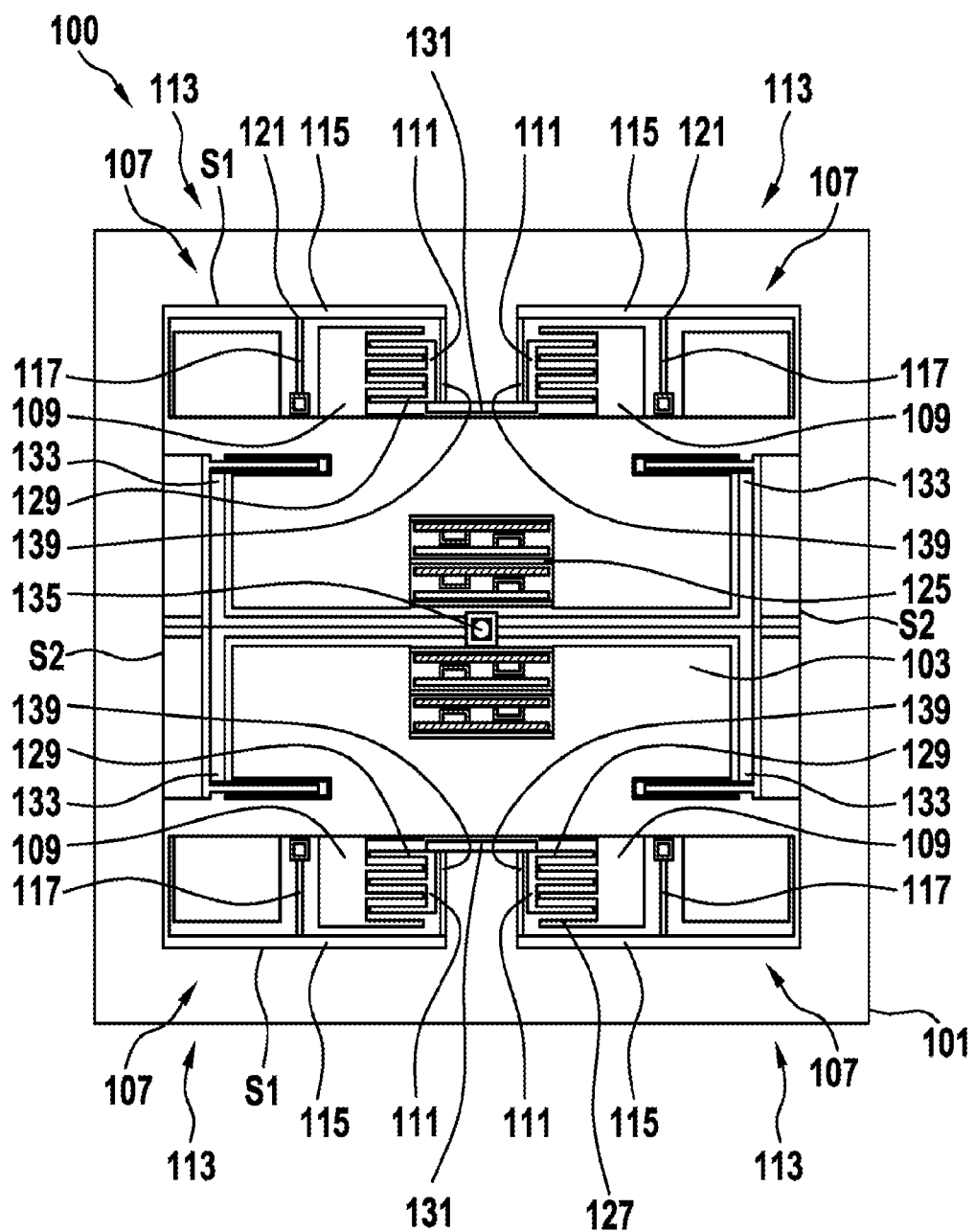
FIG. 5 shows a further schematic illustration of a micromechanical sensor structure with damping structure according to a further specific embodiment of the present invention.

FIG. 5 shows a further schematic illustration of a micromechanical sensor structure 100 with damping structure according to a further specific embodiment.

The specific embodiment in FIG. 5 is based on the specific embodiments of FIGS. 3 and 4 and differs from the specific embodiments mentioned in that the suspension spring elements 131 are laid in the interior of the deflectable mass 103 and are anchored to the substrate 101 via a common anchoring structure 135. The common anchoring structure 135 is arranged centrally in the middle of the deflectable mass 103. The arrangement of the suspension spring elements 133 and also of the common anchoring structure 135 can be varied at will in relation to the specific embodiment shown in FIG. 5.

The mode of operation of the damping structure 107 corresponds to the modes of operation described in relation to FIGS. 2 and 4 and will not be discussed anew below.

Figure 6:
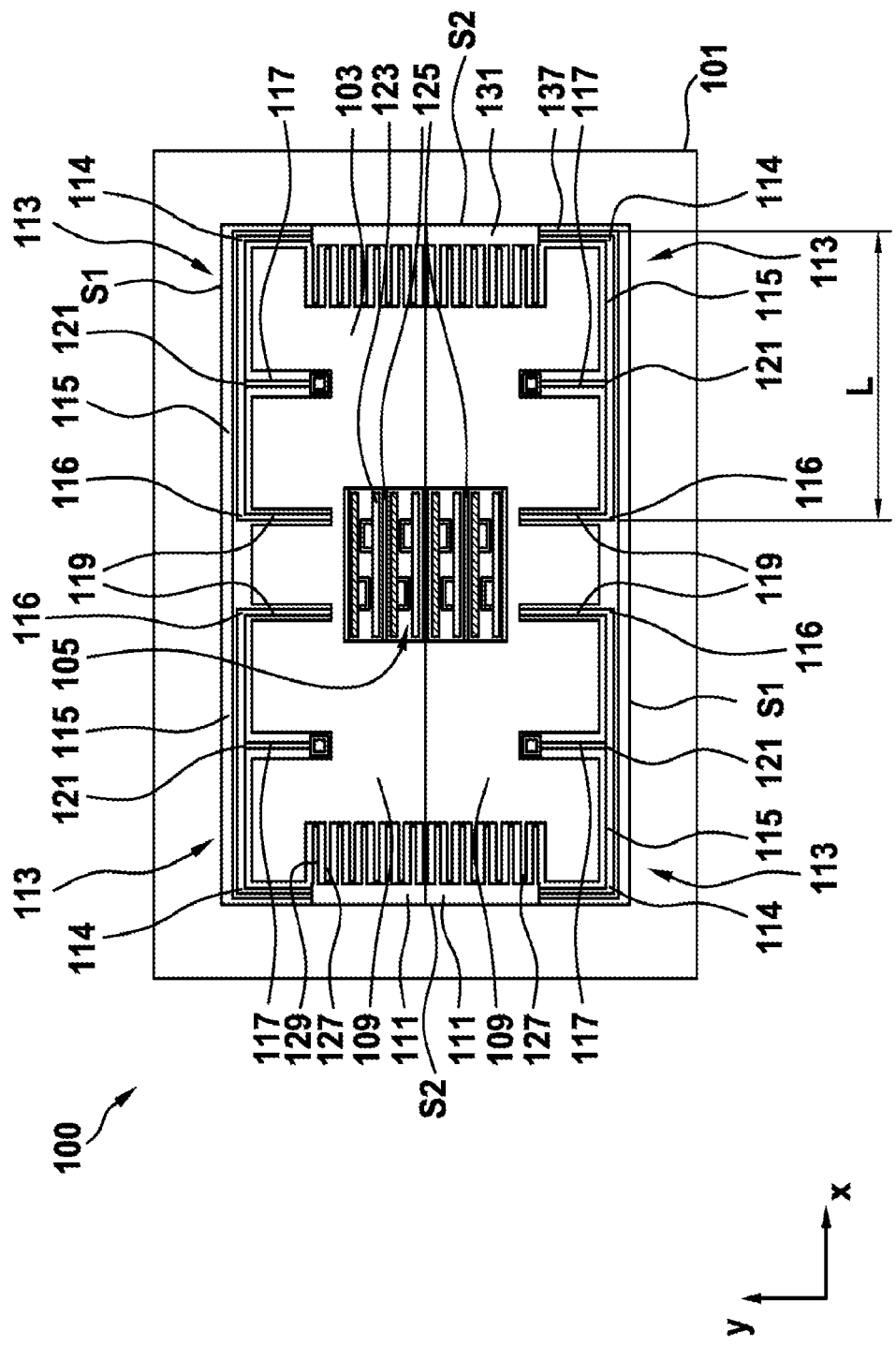
FIG. 6 shows a further schematic illustration of a micromechanical sensor structure with damping structure according to a further specific embodiment of the present invention.

FIG. 6 shows a further schematic illustration of a micromechanical sensor structure 100 with damping structure according to a further specific embodiment.

In the specific embodiment in FIG. 6, the first and second damping combs 109, 111 of a damping structure 107 are arranged on a second side S2 of the deflectable mass 103. The lever arm 115 is still anchored to the substrate 101 via the first spring element 117 and connected to the deflectable mass 103 via the second spring element 119. The connection to the deflectable mass 103 via the second spring element 119 however takes place in the middle on a first side S1 of the deflectable mass.

Further, the micromechanical sensor structure 100 comprises a bordering element 137 which connects together the second damping combs 111 of the damping structures 107 and borders the deflectable mass 103.

Figure 7:
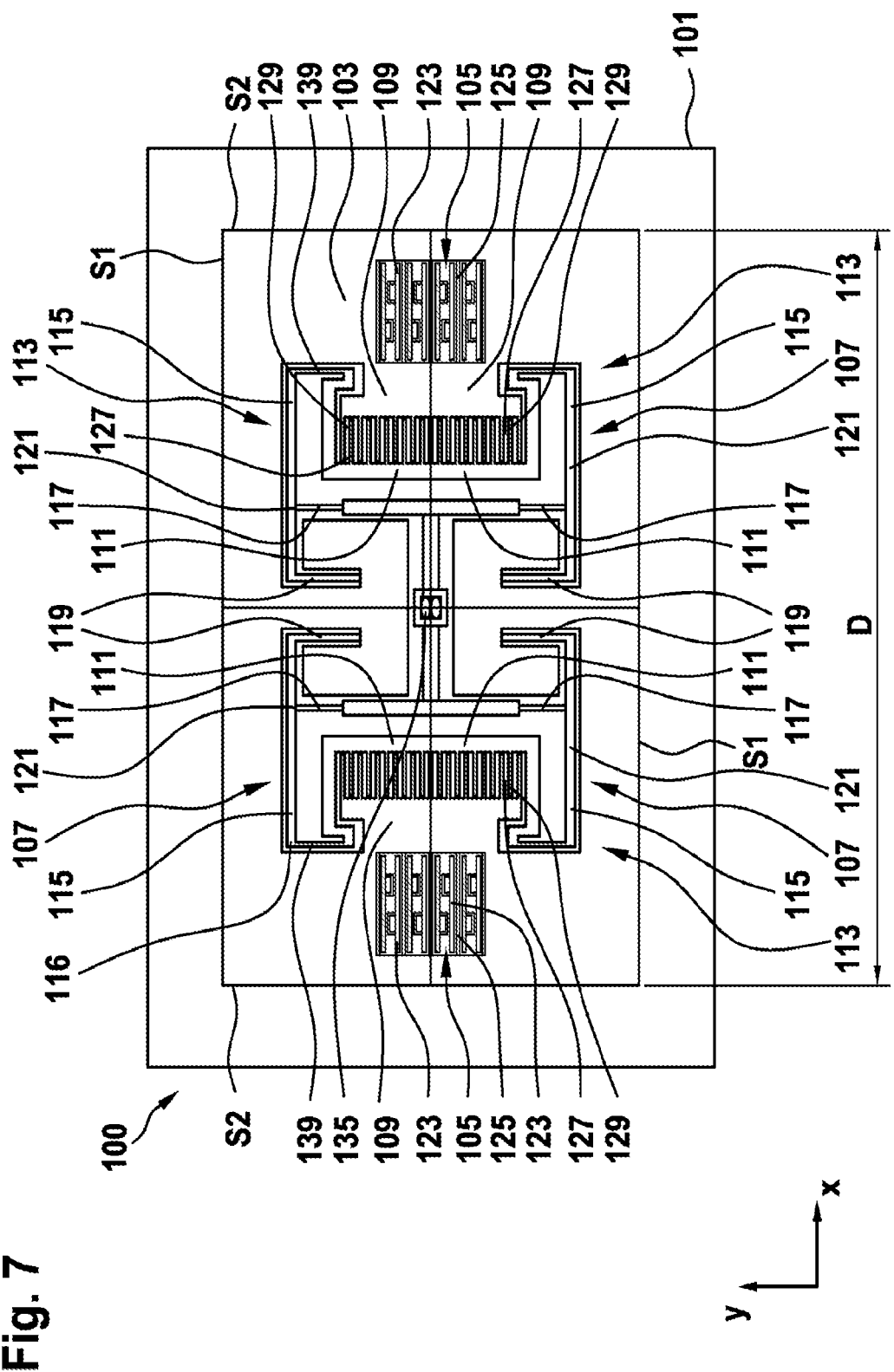
FIG. 7 shows a further schematic illustration of a micromechanical sensor structure with damping structure according to a further specific embodiment of the present invention.

FIG. 7 shows a further schematic illustration of a micromechanical sensor structure 100 with damping structure according to a further specific embodiment.

In the specific embodiment in FIG. 7, the damping structures 107 are laid in the interior of the deflectable mass 103 and are encompassed by it.

The first spring elements 117 of the damping structures 107 are anchored to the substrate 101 via a common anchoring structure 135 arranged in the middle.

Furthermore, the micromechanical sensor structure 100 in the specific embodiment shown has two identically formed measuring units 105, which are each arranged laterally on the second sides S2 of the deflectable mass 103.

The lever arms 115 are arranged in each case parallel on the first sides S1 of the deflectable mass 103 and are connected to the deflectable mass 103 via the second spring elements 119, with connection taking place in the middle of the deflectable mass 103. The first and second damping combs 109, 111 are each arranged parallel to the second sides S2 of the deflectable mass 103.

In the specific embodiment shown, too, the deflectable mass 103 is deflectable in the positive and the negative y-direction. The damping of the deflection of the deflectable mass 103 via the damping structures 107 corresponds to the behavior described above of the further specific embodiments.

The second damping combs 111 are in each case connected to the second end 116 of the lever arm 115 of the corresponding damping structure 107 via a connecting element 139.

What is claimed is:

1. A micromechanical sensor structure, comprising:
a substrate;
a mass can be elastically deflected relative to the substrate;
a measuring unit configured to detecting a deflection of the mass; and
a damping structure configured to damp the deflection of the mass, the damping structure including first and second damping combs which mesh together, wherein the first damping comb is arranged on the mass and the second damping comb is arranged movably on a deflecting structure, and wherein, when the mass is deflected in a first direction, the second damping comb is moved via the deflecting structure relative to the substrate in a second direction opposite the first direction.

2. The sensor structure as recited in claim 1, wherein the deflecting structure is a rocker structure with a pivotable lever arm, wherein the lever arm is pivotably mounted via a first spring element anchored to the substrate, wherein the second damping comb is arranged on a first end of the lever arm, and wherein the lever arm is connected to the mass via a second spring element arranged on a second end of the lever arm.

3. The sensor structure as recited in claim 1, wherein the micromechanical sensor structure includes a plurality of damping structures.

4. The sensor structure as recited in claim 3, wherein the mass is fastened elastically deflectably to the substrate via first spring elements of the deflecting structures.

5. The sensor structure as recited in claim 1, wherein the first spring elements of the damping structures are connected to the substrate in a common anchoring structure.

6. The sensor structure as recited in claim 3, wherein the damping structures are arranged on an edge region of the mass and at least partly encompass the mass; and/or
the damping structures are arranged in an inner region of the mass and are at least partly encompassed by the mass.

7. The sensor structure as recited in claim 3, wherein second damping combs of adjacent ones of the damping structures are connected together via a common third spring element.

8. The sensor structure as recited in claim 7, wherein a first length of a first portion of a lever arm between the first spring element and the second spring element is more than twice a second length of a second portion of the lever arm between the first spring element and the third spring element.

9. The sensor structure as recited in claim 2, wherein the lever arm extends along a direction perpendicular to a direction of deflection of the mass.

10. The sensor structure as recited in claim 2, wherein a length of the lever arm is greater than 15% of a diameter of the mass.

11. The sensor structure as recited in claim 2, wherein a damping behavior of the damping structure can be varied by way of a positioning of a suspension point at which the lever arm is connected to the first spring element.

12. The sensor structure as recited in claim 1, wherein the measuring unit includes at least a first measuring electrode arranged on the substrate and a second measuring electrode arranged opposite the first measuring electrode on the mass, wherein the first and second damping combs have first and second damping fingers extending perpendicularly to a direction of deflection of the mass and arranged parallel to the first and second measuring electrodes, and the first and second damping fingers have an identical electrical potential.

13. The sensor structure as recited in claim 12, wherein in a rest position of the mass, a distance between directly opposing ones of the first and second damping fingers is greater than or equal to a distance between directly opposing first and second measuring electrodes.

14. The sensor structure as recited in claim 1, wherein the mass is fastened elastically deflectably to the substrate via at least one suspension spring element.

15. The sensor structure as recited in claim 1, wherein the micromechanical sensor structure is an acceleration sensor or yaw rate sensor or micromirror.

* * * * *